United States Patent
Kume et al.

(10) Patent No.: US 10,572,753 B2
(45) Date of Patent: Feb. 25, 2020

(54) OUTSIDE RECOGNITION DEVICE FOR VEHICLE

(71) Applicant: Hitachi, Ltd., Chiyoda-ku, Tokyo (JP)

(72) Inventors: Hideyuki Kume, Tokyo (JP); Masahiro Kiyohara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 161 days.

(21) Appl. No.: 15/769,153

(22) PCT Filed: Nov. 25, 2015

(86) PCT No.: PCT/JP2015/082967
§ 371 (c)(1),
(2) Date: Apr. 18, 2018

(87) PCT Pub. No.: WO2017/090097
PCT Pub. Date: Jun. 1, 2017

(65) Prior Publication Data
US 2018/0307932 A1    Oct. 25, 2018

(51) Int. Cl.
*G06K 9/32* (2006.01)
*G08G 1/16* (2006.01)
(Continued)

(52) U.S. Cl.
CPC ....... *G06K 9/3208* (2013.01); *G06K 9/00805* (2013.01); *G08G 1/166* (2013.01); *H04N 7/183* (2013.01)

(58) Field of Classification Search
CPC .. G06K 9/00805; G06K 9/3208; G08G 1/166; H04N 7/183
See application file for complete search history.

(56) References Cited

U.S. PATENT DOCUMENTS

| | | |
|---|---|---|
| 5,410,346 A | 4/1995 | Saneyoshi et al. |
| 2007/0222566 A1 | 9/2007 | Tsuji et al. |
| | (Continued) | |

FOREIGN PATENT DOCUMENTS

| | | |
|---|---|---|
| JP | 5-265547 A | 10/1993 |
| JP | 2005-173899 A | 6/2005 |
| | (Continued) | |

OTHER PUBLICATIONS

Japanese-language Office Action issued in counterpart Japanese Application No. 2017-552566 dated Jan. 29, 2019 with unverified English translation (seven pages).

(Continued)

*Primary Examiner* — Manuchehr Rahmjoo
(74) *Attorney, Agent, or Firm* — Crowell & Moring LLP (57) ABSTRACT

The purpose of the present invention is to provide an outside recognition device for a vehicle with which it is possible to correctly estimate the orientation of an obstruction. An outside recognition device according to the present invention is provided with an obstruction detection unit for detecting an obstruction in an image, an orientation estimation unit for estimating the orientation of the obstruction detected by the obstruction detection unit, and an orientation correction unit for correcting the orientation estimated by the orientation estimation unit in accordance with the positional relationship of the obstruction and the camera. With this outside recognition device for a vehicle, it is possible to correctly estimate the orientation of the obstruction.

10 Claims, 5 Drawing Sheets

(51) Int. Cl.
    *H04N 7/18*     (2006.01)
    *G06K 9/00*     (2006.01)

(56) References Cited

U.S. PATENT DOCUMENTS

| | | | |
|---|---|---|---|
| 2012/0327236 A1* | 12/2012 | Kiyohara | G06K 9/00369 348/148 |
| 2014/0063248 A1 | 3/2014 | Sakagami et al. | |
| 2015/0178576 A1* | 6/2015 | Gupta | G06K 9/00805 348/148 |

FOREIGN PATENT DOCUMENTS

| | | | |
|---|---|---|---|
| JP | 2007-279808 A | 10/2007 | |
| JP | 2008-230561 A | 10/2008 | |
| JP | 2010-250541 A | 11/2010 | |
| JP | 2014-50100 A | 3/2014 | |
| JP | 2014-142241 A | 8/2014 | |

OTHER PUBLICATIONS

International Search Report (PCT/ISA/210) issued in PCT Application No. PCT/JP2015/082967 dated Mar. 1, 2016 with English-language translation (three (3) pages).

Japanese-language Written Opinion (PCT/ISA/237) issued in PCT Application No. PCT/JP2015/082967 dated Mar. 1, 2016 (four (4) pages).

* cited by examiner

OUTSIDE RECOGNITION DEVICE FOR VEHICLE

TECHNICAL FIELD

The present invention relates to an outside recognition device for a vehicle.

BACKGROUND ART

In vehicle driving assistance, there is a need to detect orientations of obstructions to predict behaviors of the obstructions around a vehicle. PTL 1 discloses "a vehicle periphery monitoring device of the present invention is a vehicle periphery monitoring device for monitoring the periphery of the vehicle from an image acquired by an imaging means equipped in the vehicle, the vehicle periphery monitoring device including: an object extraction means for extracting objects present around the vehicle from the image acquired through the imaging means; a pedestrian extraction means for extracting a pedestrian from the objects extracted by the object extraction means; an attitude determination means for determining an attitude of the pedestrian extracted by the pedestrian extraction means; an avoidance object determination means for determining whether the object extracted by the object extraction means is an avoidance object to avoid a contact with the vehicle, by at least executing a determination algorithm containing at least first determination processing on the attitude of the pedestrian determined by the attitude determination means; and a vehicle equipment control means for controlling equipment of the vehicle at least depending on the determination result of the avoidance object determination means".

CITATION LIST

Patent Literature

PTL 1: JP 2007-279808 A

SUMMARY OF INVENTION

Technical Problem

In the invention described in PTL 1, since it is not considered, in particular, in an image acquired by a wide angle camera that appearances of obstructions are greatly changed depending on a positional relationship between the obstruction and the camera even if the obstructions lie in the same orientation, the orientations of the obstructions may be erroneously estimated, in particular, at an image edge.

An object of the present invention is to provide an outside recognition device for a vehicle capable of correctly estimating an orientation of an obstruction.

Solution to Problem

An outside recognition device for a vehicle according to the present invention includes: an obstruction detection unit for detecting an obstruction in an image; an orientation estimation unit for estimating the orientation of the obstruction detected by the obstruction detection unit; and an orientation correction unit for correcting the orientation estimated by the orientation estimation unit depending on a positional relationship between the obstruction and a camera.

Advantageous Effects of Invention

According to the present invention, it is possible to correctly estimate the orientation of the obstruction.

DESCRIPTION OF EMBODIMENTS

Hereinafter, embodiments of the present invention will be described with reference to the drawings.

EXAMPLE 1

Hereinafter, an outside recognition device for a vehicle of the present example is described with reference to FIGS. 1 to 6.

Configuration

Figure 1:
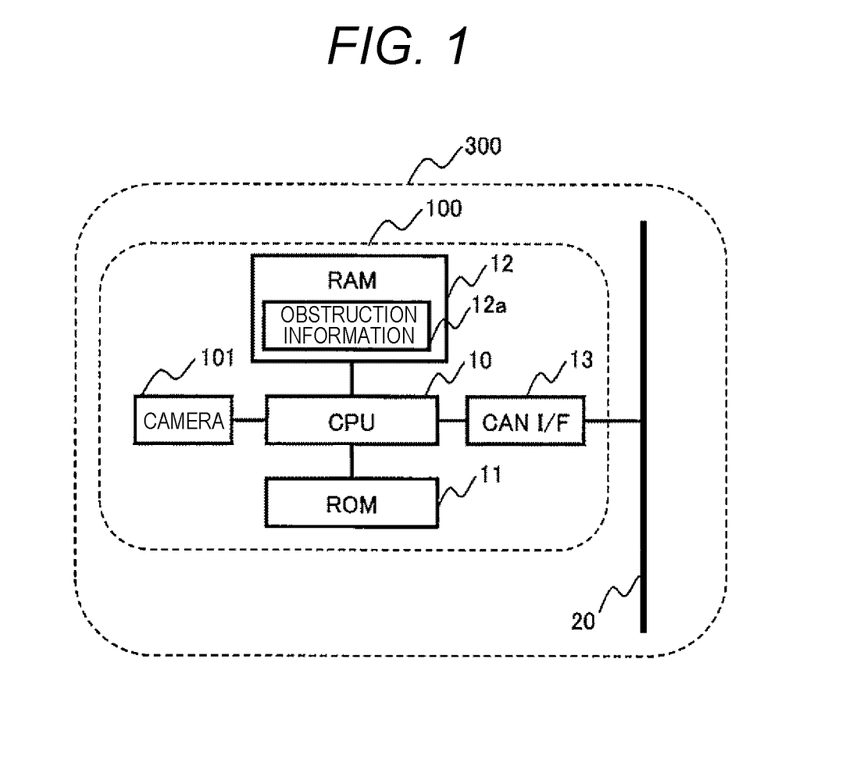
FIG. 1 is a diagram showing a configuration of an outside recognition device 100 for a vehicle.

FIG. 1 is a diagram showing a configuration of an outside recognition device 100 for a vehicle built in a vehicle 300. The vehicle 300 is equipped with a CAN bus 20, and the outside recognition device 100 for a vehicle is connected to the CAN bus 20. Other devices (not shown) are also connected to the CAN bus 20. That is, a device for controlling the vehicle based on obstruction information output from the outside recognition device 100 for a vehicle is connected to the CAN bus 20.

The outside recognition device 100 for a vehicle includes a camera 101, a CPU 10, a ROM 11, a RAM 12, and a CAN interface 13.

The camera 101 is mounted on the vehicle 300 and photographs the periphery of the vehicle 300.

The CPU 10 calculates obstruction information at each predetermined cycle, for example, every 0.1 seconds based on an image acquired by the camera 101 by using programs to be described below. The calculated obstruction information is output to the CAN bus 20 via the CAN interface 13. Hereinafter, the above-described predetermined cycle is referred to as "processing cycle".

Programs and camera parameters are stored in the ROM 11. The programs are developed and executed from the ROM 11 to the RAM 12 by the CPU 10. The camera parameters are internal parameters such as lens distortion and external parameters such as the mounting position and angle of the camera 101 on the vehicle 300. An obstruction information area 12a or other information necessary for executing the programs is temporarily stored in the RAM 12. The obstruction information area 12a is a predetermined area of the RAM 12 in which information on an obstruction estimated by an obstruction detection unit 102, an orientation estimation unit 103, and an orientation correction unit 104 to be described below is stored. The information on the obstruction is the position and orientation of the obstruction.

The CAN interface 13 is a communication interface with the CAN bus 20 of the outside recognition device 100 for a vehicle. The outside recognition device 100 for a vehicle outputs the calculated obstruction information to the CAN bus 20 via the CAN interface 13.

Function Block

Figure 2:
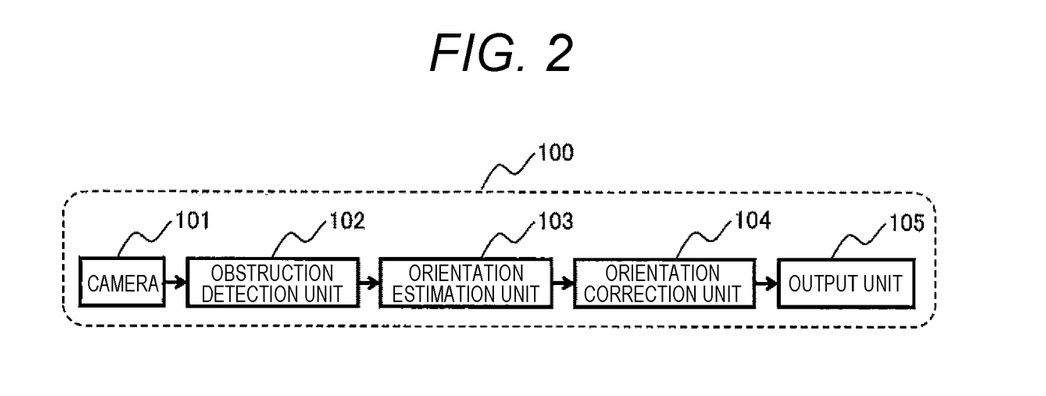
FIG. 2 is a diagram showing functions of programs executed in the outside recognition device 100 for a vehicle as a function block.

FIG. 2 is a diagram showing the functions of the programs executed in the CPU 10 of the outside recognition device 100 for a vehicle as a function block. That is, the outside recognition device 100 for a vehicle includes an obstruction detection function by the obstruction detection unit 102, an orientation estimation function by the orientation estimation unit 103, an orientation correction function by the orientation correction unit 104, and an output function by the output unit 105, depending on the programs executed by the CPU 10. If the camera 101 performs photographing at each predetermined cycle, that is, processing cycle to acquire an image, the outside recognition device 100 for a vehicle performs processing by each function block. Specifically, if the camera performs photographing to acquire an image, the obstruction detection unit 102 starts processing, if the obstruction detection unit 102 completes processing, the orientation estimation unit 103 starts processing, and if the orientation estimation unit 103 completes processing, the orientation correction unit 104 starts processing. That is, each function block is operated at each processing cycle.

The obstruction detection unit 102 detects obstructions existing around the subject vehicle 300 from the image acquired by the photographing of the camera 101 and adds information on the detected obstructions to the obstruction information area 12a. Examples of the detection of the obstructions include a detection of a pedestrian or a vehicle based on the image, which is detected as obstructions. For the detection of the pedestrian, for example, a method based on pattern matching disclosed in JP 2015-132879 A can be used.

The orientation estimation unit 103 estimates the orientation of the obstruction by using the information on the obstruction which is output from the obstruction detection unit 102 and stored in the RAM 12, the image information including luminance of the image acquired by the photographing of the camera 101, and parameters of an identifier in every orientation of the obstruction stored in the ROM 11, and adds the estimated orientation of the obstruction to the obstruction information area 12a. The details of the processing will be described below.

The orientation correction unit 104 corrects the orientation of the obstruction depending on the positional relationship between the obstruction and the camera 101 by using the information on the obstruction which is output from the obstruction detection unit 102 and the orientation estimation unit 103 and stored in the RAM 12 and the camera parameters stored in the ROM 11, and adds the corrected orientation of the obstruction to the obstruction information area 12a. The details of the processing will be described below.

The output unit 105 outputs the obstruction information to the CAN bus 20 via the CAN interface 13.

Operation of Orientation Estimation Unit

Figure 3:
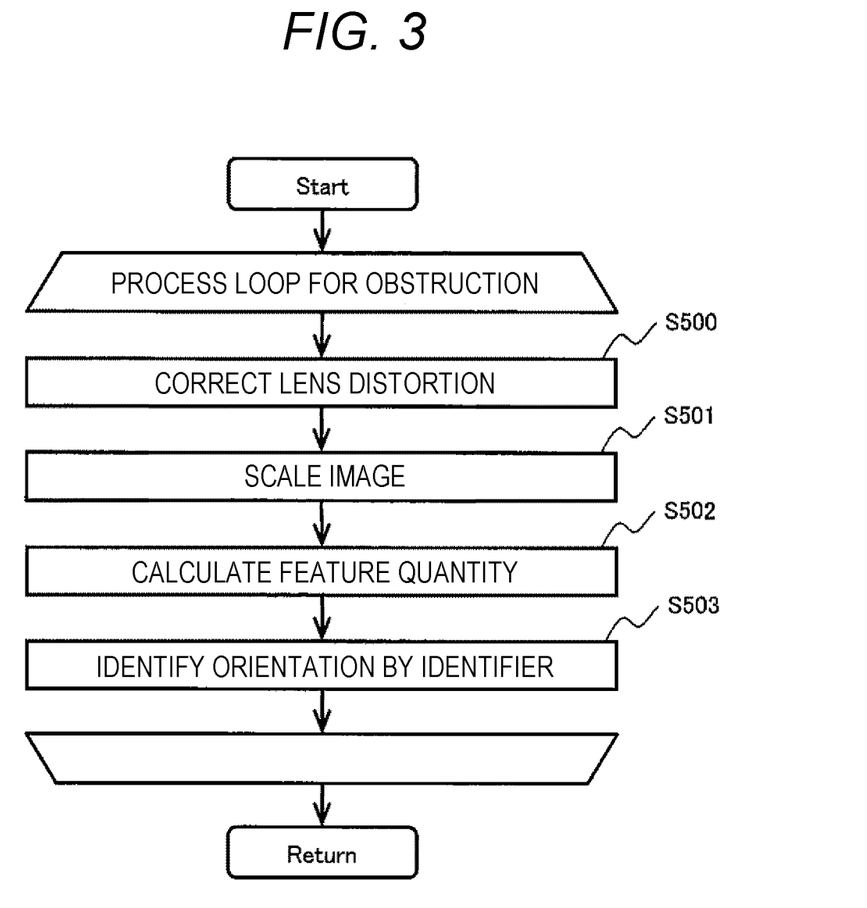
FIG. 3 is a flowchart showing processing executed in an orientation estimation unit 103.

Next, the contents of the processing in the orientation estimation unit 103 are described with reference to FIGS. 3 and 4. FIG. 3 is a flowchart showing the processing executed in the orientation estimation unit 103. The execution entity of each step to be described below is the CPU 10.

In step S500, the lens distortion correction is performed using the camera parameters stored in the ROM 11 with respect to the obstruction area in the image acquired by the photographing of the camera 101, and then the process proceeds to step S501. The lens distortion correction is a known technology, and therefore the detailed description thereof is omitted. The lens distortion correction guarantees the change in the pattern due to the lens distortion to improve the accuracy of the orientation estimation based on the pattern in step S503 described below.

Here, the lens distortion correction is performed in the orientation estimation unit 103, but is not limited thereto. When the obstruction detection unit 102 uses, for example, the method based on the pattern matching described in JP 2015-132879 A, the obstruction detection unit 102 may perform the lens distortion correction on the entire image, the RAM 12 may store the image subjected to the lens distortion correction, and the orientation estimation unit 103 may use the image.

In step S501, the obstruction area in the image subjected to the lens distortion correction is scaled and an image having a size used for calculating a preset feature quantity is generated, and then the process proceeds to step S502. For example, the size used for the calculation of the feature quantity is 12 pixels wide and 24 pixels high.

In step S502, the feature quantity used for the orientation estimation is calculated from the image generated in step S501, and then the process proceeds to step S503. As the feature quantity, for example, a luminance gradient of an image can be used, and HOG (N. Dalal and B. Triggs, Histograms of Oriented Gradients for Human Detection, Proc. IEEE int. Conf. on Computer Vision and Pattern Recognition, pp. 886-893, 2005) known as a method effective for an object detection, an improvement method of the HOG disclosed in JP 2015-132879 A, or the like can be used.

Here, the calculation of the feature quantity is performed in the orientation estimation unit 103, but is not limited thereto. When the obstruction detection unit 102 uses, for example, the method based on the pattern matching disclosed in JP 2015-132879 A, the RAM 12 may store the feature quantity used for the obstruction detection and the orientation estimation unit 103 may use the stored feature quantity. By doing so, it is possible to reduce the number of times of calculation of the feature quantity and to reduce the processing time. On the other hand, when the orientation estimation unit 103 performs the calculation of the feature quantity, a feature quantity different from that of the obstruction detection unit 102 can be used. For example, in the obstruction detection unit 102 which handles the entire image as a processing object, the HOG with a relatively small calculation amount is used, and in the orientation estimation unit 103 which handles only the obstruction area as a processing object, the improvement method of the HOG which increases the calculation amount but can express fine patterns is used, thereby improving the accuracy of the orientation estimation while suppressing the increase in the calculation amount.

In step S503, the feature quantity calculated in step S502 is input to the identifier to obtain the orientation. As the identifier, for example, the SVM (C. Cortes and V. Vapnik, Support-vector Networks, Machine Learning, Vol. 20, Issue 3, pp. 273-297, 1995) which is known to have good accuracy even when the number of dimensions of the feature quantity is large and the number of training images is small. In order to perform the identification using the SVM, it is necessary to obtain parameters to be used for the identification by generating feature quantities from image data of obstructions in every orientation in advance and training the SVM. For example, the SVM is trained using feature quantities calculated from image data of a backward orientation (0°), a right orientation (90°), a forward orientation (180°), and a left orientation (270°), and the parameters of the training result are stored in the ROM 11. In step S503, it is obtained at which of the backward orientation (0°), the right orientation (90°), the forward orientation (180°), and the left orientation (270°) the obstruction is by the SVM from the parameters stored in the ROM 11 and the feature quantities calculated in step S502.

Here, although the orientation of the obstruction handled by the SVM is set to be the backward orientation (0°), the right orientation (90°), the forward orientation (180°), and the left orientation (270°), the orientation of the obstruction is not limited thereto. For example, it is possible to set the number of orientations according to the requirement of a method using an orientation of an obstruction for a vehicle control or the like, such as two orientations of the right orientation (90°) and the left orientation (270°) or orientations obtained by dividing 360° into 8 orientations.

In addition, the SVM is used as the identifier, but the identifier is not limited thereto. For example, an identifier such as a neural network or a decision tree may be used. Hereinafter, the processing is performed on all the obstructions from step S500 to step S503, and the processing of the orientation estimation unit 103 ends.

Here, in the orientation estimation unit 103, since it is not considered, in particular, in an image acquired by a wide angle camera that appearances of obstructions are greatly changed depending on the positional relationship between the obstruction and the camera even if the obstructions lie in the same orientation, the orientations of the obstructions may be erroneously estimated, in particular, at an image edge.

Figure 4:
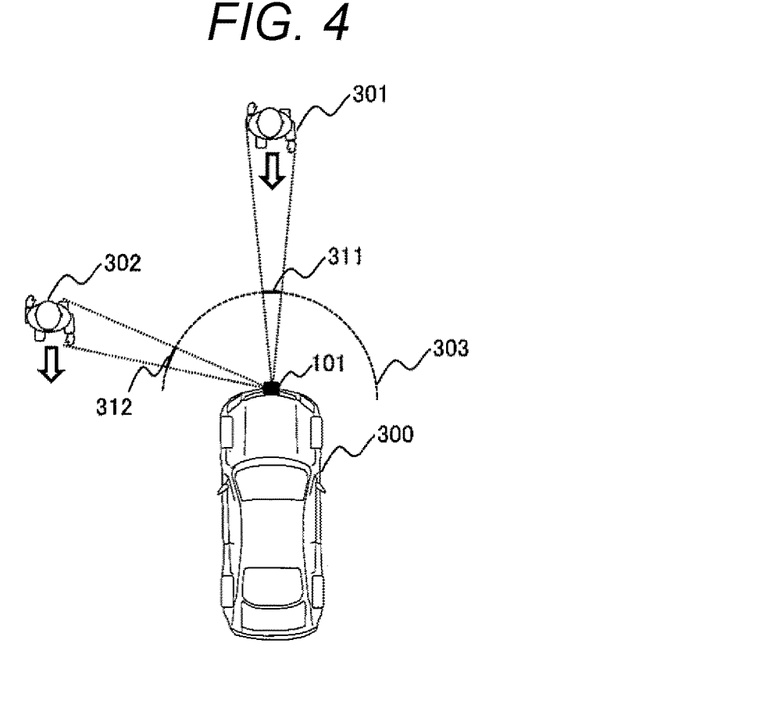
FIG. 4 is a diagram showing an example of photographing by a wide angle camera.

FIG. 4 shows an example of photographing by the wide angle camera. Pedestrians 301 and 302 are photographed by a wide angle camera 101 mounted on a subject vehicle. In FIG. 4, as the wide angle camera 101, a fish-eye camera in which a distance from a center of an image is proportional to an angle of light ray is considered, and an image plane 303 of the camera is represented by an arc. The pedestrians 301 and 302 are detected as obstructions by the obstruction detection unit 102. The pedestrian 301 is photographed in an area 311 of the image plane 303 of the camera and the pedestrian 302 is photographed in an area 312 of the image plane 303 of the camera. Here, since a front side of a pedestrian is photographed, the orientation estimation unit 103 estimates that the pedestrian 301 is in the forward orientation (180°). On the other hand, since a left side of a pedestrian is photographed, the orientation estimation unit 103 estimates that the pedestrian 302 is in the left orientation (270°).

Operation of Orientation Correction Unit

Figure 5:
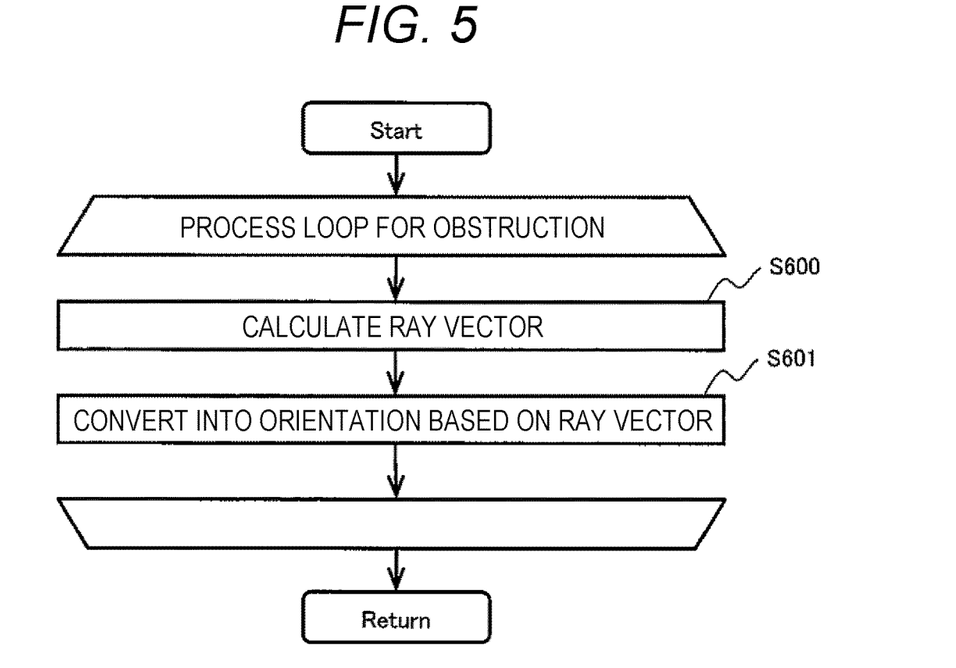
FIG. 5 is a flowchart showing processing executed in an orientation correction unit 104.

Next, the contents of the processing in the orientation correction unit 104 are described with reference to FIGS. 5 and 6. The orientation correction unit 104 corrects the orientation of the obstruction estimated by the orientation estimation unit 103 depending on the positional relationship between the obstruction and the camera 101. FIG. 5 is a flowchart showing the processing executed in the orientation correction unit 104. The execution entity of each step to be described below is the CPU 10.

In step S600, a ray vector which is an orientation vector from the camera 101 toward the obstruction is calculated based on the position of the obstruction in the image detected by the obstruction detection unit 102 and the camera parameters stored in the ROM 11, and the process proceeds to step S601. First, the ray vector on a three-dimensional coordinate system (camera coordinate system) using the camera 101 as a reference is calculated by using the position of the obstruction in the image and the camera internal parameters. Next, the ray vector in the camera coordinate system is converted into a two-dimensional coordinate system (vehicle coordinate system), which uses the vehicle 300 as a reference and is parallel to a ground, by using the camera external parameters indicating the mounting position and angle of the camera 101 on the vehicle 300.

In step S601, the orientation of the obstruction estimated by the orientation estimation unit 103 is corrected using the ray vector on the vehicle coordinate system calculated in step S600 to obtain the orientation of the obstruction on the vehicle coordinate system. Specifically, the orientation estimated by the orientation estimation unit 103 is converted into the orientation based on the ray vector by adding the angle of the ray vector on the vehicle coordinate system into the angle estimated by the orientation estimation unit 103, thereby obtaining the orientation on the vehicle coordinate system.

Figure 6:
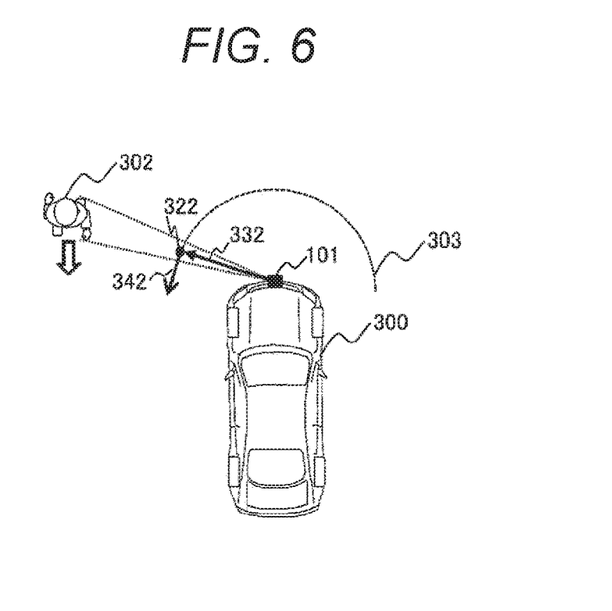
FIG. 6 is a diagram showing an example of processing executed in the orientation correction unit 104.

FIG. 6 is a diagram showing an example of the processing of the orientation correction unit 104. In this example, the pedestrian 302 is photographed on the image plane 303 by the wide angle camera 101 mounted on the subject vehicle 300. As described in the example of FIG. 4, in the orientation estimation by the orientation estimation unit 103, the orientation of the pedestrian 302 is estimated to be the left orientation (270°). In step S600, a ray vector 332 from the wide angle camera 101 to the pedestrian 302 is calculated. Here, as the position of the pedestrian in the image, a center 322 of the pedestrian area is used. In step S601, the orientation estimated by the orientation estimation unit 103 is converted into the orientation based on the ray vector 332 to obtain the corrected orientation vector 342.

Hereinafter, the processing is performed on all the obstructions from step S600 to step S601, and the processing of the orientation correction unit 104 ends.

Effects

The following effects can be obtained by the outside recognition device for a vehicle of this example.

(1) The outside recognition device 100 for a vehicle includes the camera 101 mounted on a vehicle 300 to photograph the periphery of the vehicle, the obstruction detection unit 102 for detecting the obstruction in the image based on the image acquired by the photographing of the camera 101, the orientation estimation unit 103 for estimating the orientation of the obstruction detected by the obstruction detection unit 102, and the orientation correction unit 104 for correcting the orientation estimated by the orientation estimation unit 103 depending on the positional relationship between the obstruction and the camera 101.

In the outside recognition device 100 for a vehicle, the orientation correction unit 104 is configured to correct the orientation obtained by the estimation of the orientation estimation unit 103 depending on the positional relationship between the obstruction detected by the obstruction detection unit 102 and the camera 101. Therefore, the estimation accuracy of the orientation of the obstruction can be improved particularly at the image edge of the wide angle camera. As a result, it is possible to estimate an orientation of an object in a wide range by using the wide angle camera.

(2) The orientation correction unit 104 calculates the ray vector from the camera 101 to the obstruction based on the position of the obstruction in the image detected by the obstruction detection unit 102 and the camera parameters, and converts the orientation estimated by the orientation estimation unit 103 into the orientation based on the ray vector (steps S600 and S601 in FIG. 5). As a result, the relationship between the image and the vehicle coordinate system, that is, the imaging process of the image is taken into consideration, such that the accuracy of the orientation of the obstruction on the vehicle coordinate system is improved.

Modification Example 1

The orientation correction unit 104 converts the orientation estimated by the orientation estimation unit 103 based on the ray vector from the camera 101 to the obstruction to correct the orientation (steps S600 and S601 in FIG. 5). However, the method of correcting an orientation is not limited thereto.

The orientation correction unit 104 may correct the orientation by using a table that is prepared in advance and stores the relationship between the orientation estimated by the orientation estimation unit 103 and the position of the obstruction in the image and the orientation after correction.

According to the above-described Modification Example 1, the following effects can be obtained.

(1) The orientation correction unit 104 corrects the orientation without using the camera parameters. As a result, even when the accuracy of the camera parameters is low or when the camera parameters are not obtained, the orientation estimated by the orientation estimation unit 103 can be corrected.

(2) The orientation correction unit 104 corrects the orientation by the arbitrarily set table. As a result, it is possible to arbitrarily correct the orientation depending on the positional relationship between the obstruction and the camera 101.

Modification Example 2

In the Example 1 described above, the obstruction detection unit 102 detects the obstruction from the image photographed by the camera 101 mounted on the vehicle. However, the detection method of the obstruction is not limited thereto. The outside recognition device 100 for a vehicle may also include a sensor for measuring a distance such as radar, a laser scanner, and a stereo camera, in addition to the camera 101. In addition, one or more cameras may be additionally provided to configure a stereo camera in combination with the camera 101.

If the sensor measuring the distance is provided in addition to the camera 101, the obstruction may be detected based on the distance information measured by the distance measurement sensor. For example, an object having a height from a road surface greater than or equal to a preset threshold value is detected as an obstruction. In addition, pedestrians or vehicles are detected from a shape or movement of an object acquired based on the distance information, which may be considered as an obstruction. The position of the obstruction detected by the distance measurement sensor is converted into the position of the obstruction in the image by a projection calculation based on the mounting position and angle of the distance measurement sensor on the vehicle and the camera parameters of the camera 101, and is used by the orientation estimation unit 103. In addition, the detection result of the distance measurement sensor is verified by applying the method for detecting an obstruction from an image, for example, based on the pattern matching only to the periphery of the position of the obstruction in the image detected by the distance measurement sensor and then may be used by the orientation estimation unit 103.

In order to perform this Modification Example, it is necessary to add the following functions to the outside recognition device 100 for a vehicle. For example, it is necessary to add a function of detecting an obstruction from the distance measured by the distance measurement sensor for measuring a distance to objects existing around the vehicle and a function of calculating an imaging position of the obstruction on the image from the position of the obstruction detected by the distance measurement sensor.

Modification Example 3

In the Example 1 described above, the outside recognition device 100 for a vehicle is connected to other devices via the CAN bus 20 of the vehicle 300. However, the connection relationship between the outside recognition device 100 for a vehicle and other devices is not limited thereto.

The outside recognition device 100 for a vehicle may be connected to other devices via a communication bus other than the CAN or may be directly connected to other devices without the communication bus. In addition, the outside recognition device 100 for a vehicle may be built into a camera device or an integrated controller.

EXAMPLE 2

A description of an outside recognition device for a vehicle according to Example 2 will be made with reference to FIGS. 7 and 8. In the following description, the same reference numerals are given to the same components as those in the Example 1, and the difference from the Example 1 is mainly described. In particular, the points which are not described are the same as those of the Example 1. This Example 2 is different from the Example 1 mainly in terms of the processing of the orientation estimation unit.

Configuration

A configuration of an outside recognition device 100*a* for a vehicle is the same as that of the Example 1 except for the program stored in the ROM 11 and the parameters of the identifier used for estimating the orientation.

Figure 7:
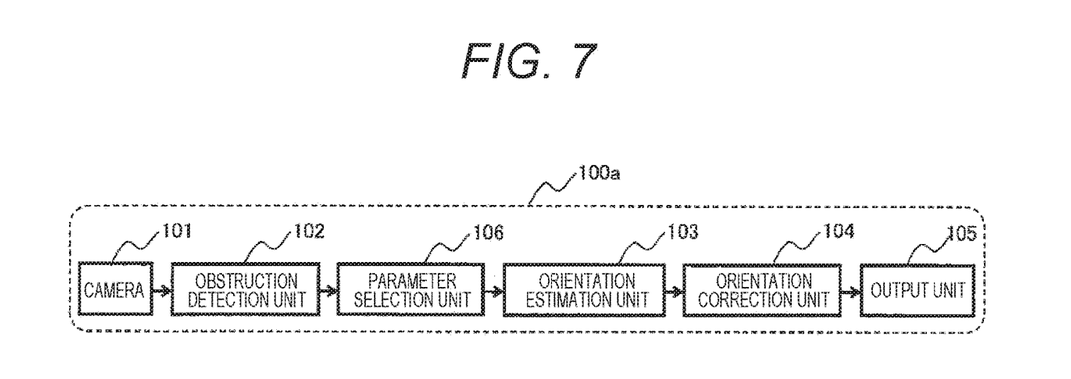
FIG. 7 is a diagram showing functions of programs executed in an outside recognition device 100a for a vehicle as a function block.

FIG. 7 is a diagram showing the functions of the program executed in the outside recognition device 100*a* for a vehicle as the function block. The difference between the Example 2 and the Example 1 is as follows. In the Example 2, in addition to the functions included in the obstruction detection device 100 in the Example 1, a parameter selection unit 106 is further provided.

Operation of Parameter Selection Unit

The contents of the processing in the parameter selection unit 106 are described with reference to FIG. 8.

The parameter selection unit 106 selects the parameters of the identifier that the orientation estimation unit 103 uses depending on the position of the obstruction, for each obstruction detected by the obstruction detection unit 102. When the orientation estimation unit 103 uses the same parameters regardless of the position of the obstruction, orientation candidates on the vehicle coordinate system output from the orientation correction unit 104 are different depending on the positions of the obstruction and the camera 101. For example, the parameters are selected so that the difference between the orientation candidates on the vehicle coordinate system output from the orientation correction unit 104 due to the positions of the obstructions becomes small.

Figure 8:
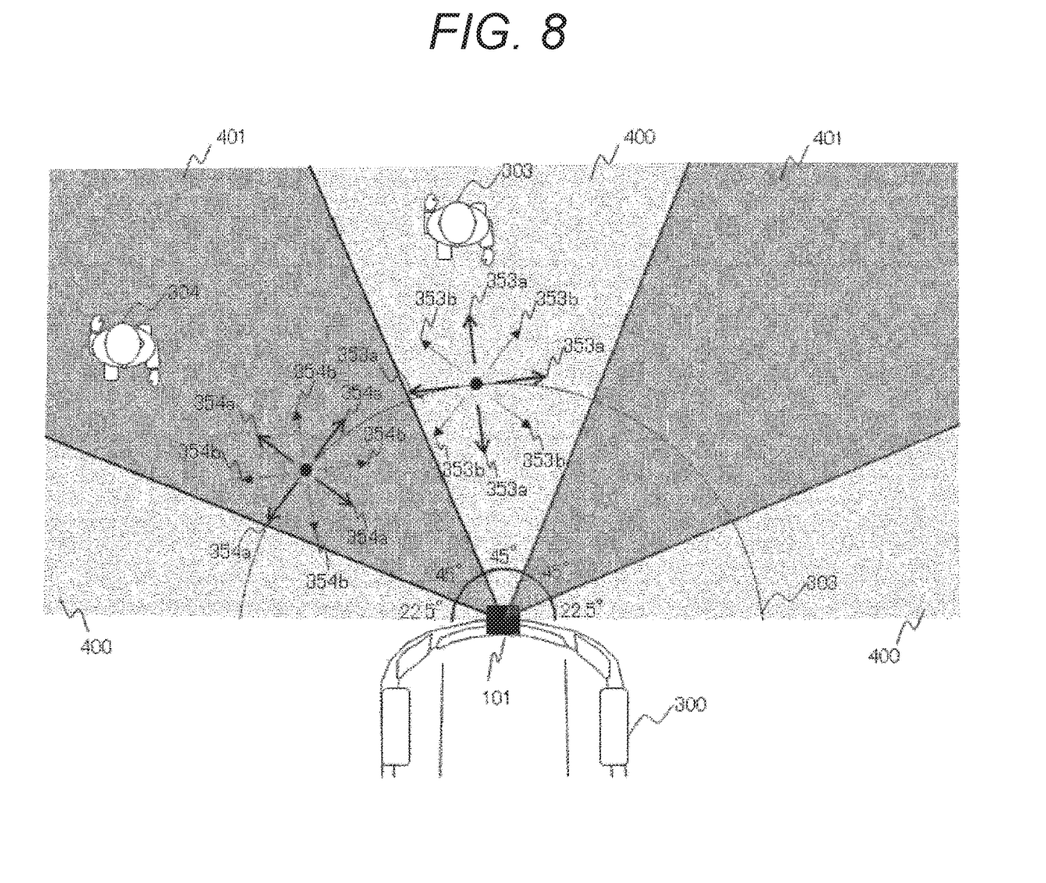
FIG. 8 is a diagram showing an example of processing executed in a parameter selection unit 106.

FIG. 8 is a diagram showing an example of the processing of the parameter selection unit 106. In this example, the parameter selection unit 106 selects parameter A of an identifier for identifying orientations of obstructions in four orientations of a backward orientation (0°), a right orientation (90°), a forward orientation (180°), and a left orientation (270°), and parameter B of an identifier for identifying orientations of obstructions in four orientations of a diagonally backward right orientation (45°), a diagonally forward right orientation (135°), a diagonally forward left orientation (225°), and a diagonally backward left orientation (315°), depending on the positions of the obstructions. For the pedestrian 303, an orientation candidate after correction by the orientation correction unit 104 in the case of using the parameter A is 353*a* and an orientation candidate after correction by the orientation correction unit 104 in the case of using the parameter B is 353*b*. Similarly, for the pedestrian 304, an orientation candidate after correction by the orientation correction unit 104 in the case of using the parameter A is 354*a* and an orientation candidate after correction by the orientation correction unit 104 in the case of using the parameter B is 354*b*.

In this case, for example, if the parameter selection unit 106 selects the parameter A for estimating an orientation of an obstruction existing in an area 400 and the parameter B for estimating an orientation of an obstruction existing in an area 401, the difference between orientation candidates after correction by the orientation correction unit 106 due to the positions of the obstructions becomes small.

Effects

According to the above-described Example 2, the following effects can be obtained.

(1) The parameter selection unit 106 selects the parameters used by the orientation estimation unit 103 depending on the positional relationship between the obstruction and the camera 101. As a result, the difference between orientation candidates on the vehicle coordinate system due to the positions of the obstructions becomes small, and it is possible to simplify the pedestrian behavior prediction method and the vehicle control method using the orientation of the obstruction output from the outside recognition device 100*a* for a vehicle.

Modification Example 1

The parameter selection unit 106 selects the parameters so that the difference between the orientation candidates on the vehicle coordinate system output from the orientation correction unit 104 due to the positions of the obstructions becomes small. However, the selection method of the parameters used by the orientation estimation unit 103 is not limited thereto.

The parameter selection unit 106 may select the parameters of the identifier which are obtained by the training using different image groups for each of the positional relationship between the obstruction and the camera 101. For example, for an obstruction near the front of the wide angle camera, the parameter of the identifier which is obtained by the training using the image of the obstruction photographed near the center of the image may be selected, and for other obstructions, the parameter of the identifier which is obtained by the training using the image of the obstruction photographed near the image edge may be selected.

According to the above-described Modification Example 1, the following effects can be obtained.

(1) The difference depending on the positional relationship between the obstruction and the camera 101, such as the lens distortion or resolution, is considered at the time of the training of the identifier for identifying the orientation of the obstruction. As a result, the accuracy of the orientation estimation by the orientation estimation unit 103 is improved.

Modification Example 2

In the outside recognition device 100*a* for a vehicle, the parameter selection unit 106 selects the parameters used by the orientation estimation unit 103 depending on the positional relationship between the obstruction and the camera 101. However, the object of the parameter selection processing depending on the positional relationship between the obstruction and the camera 101 is not limited to the parameters used by the orientation estimation unit 103.

In the outside recognition device 100*a* for a vehicle, the obstruction detection unit 102 may select the parameters used for the obstruction detection depending on the positional relationship between the obstruction and the camera 101. For example, when the obstruction detection unit 102 uses the method based on the pattern matching disclosed in JP 2015-132879 A, in a raster scan operation of the image, parameters of an identifier for identifying a pedestrian and a background may be changed depending on the position in the image.

According to the above-described Modification Example 2, the following effects can be obtained.

(1) The difference depending on the positional relationship between the obstruction and the camera 101, such as the lens distortion or resolution, is considered at the time of the training of the identifier for identifying the obstruction. As a result, the accuracy of the obstruction detection by the obstruction detection unit 102 is improved.

Modification Example 3

The orientation correction unit 104 converts the orientation estimated by the orientation estimation unit 103 based on the ray vector from the camera 101 to the obstruction to correct the orientation (steps S600 and S601 in FIG. 5). However, the correction method of the orientation is not limited thereto.

The orientation correction unit 104 may correct the orientation by further converting the orientation converted based on the ray vector. For example, it is calculated to which of four orientations of the backward orientation (0°), the right orientation (90°), the forward orientation (180°), and the left orientation (270°) on the vehicle coordinate system the orientation converted based on the ray vector is closest, and the closest orientation may be assumed to be the orientation of the obstruction after correction.

According to the above-described Modification Example 3, the following effects can be obtained.

(1) The orientation candidates output from the orientation correction unit 104 are the same with respect to all the obstructions regardless of the positional relationship between the obstruction and the camera 101. As a result, it is possible to further simplify the pedestrian behavior prediction method and the vehicle control method using the orientation of the obstruction output from the outside recognition device 100a for a vehicle.

The present invention is not limited to the above-described examples, but includes various modification examples. For example, the above-described examples have been described in detail in order to explain the present invention in an easy-to-understand manner, and the present invention is not necessarily limited to the examples including all the components described above. Other aspects considered within the scope of the technical idea of the present invention are also within the scope of the present invention. In addition, it is possible to substitute some of components of any example into components of other examples and it is possible to add components of other examples to components of any embodiment. In addition, it is possible to add, delete, or substitute other components with respect to some of components of each example. In addition, a part or all of the above-described respective components, functions, processing units, processing means, or the like may be realized by hardware by being designed as, for example, an integrated circuit. In addition, the above-described respective components, functions, or the like may be realized by software by interpreting and executing a program that realizes the respective functions by the processor. The information such as a program, a table, and a file realizing each function can be stored in recording devices such as a memory, a hard disk, and a solid state drive (SSD), or recording media such as an IC card, an SD card, and a DVD.

REFERENCE SIGNS LIST

100 outside recognition device for vehicle
101 camera
102 obstruction detection unit
103 orientation estimation unit
104 orientation correction unit
300 vehicle

The invention claimed is:

1. An outside recognition device for a vehicle, comprising:
a camera which is mounted on the vehicle to photograph a periphery of the vehicle;
an obstruction detection unit which detects a position of an obstruction in an image acquired by photographing of the camera;
an orientation estimation unit which estimates an orientation of the obstruction detected by the obstruction detection unit; and
an orientation correction unit which corrects the orientation of the obstruction estimated by the orientation estimation unit depending on a positional relationship between the obstruction and the camera; and
a parameter selection unit which selects a parameter used by the orientation estimation unit depending on the positional relationship between the obstruction detected by the obstruction detection unit and the camera; and
wherein the parameter selection unit selects a parameter so that a difference between orientation candidates output from the orientation correction unit due to the position of the obstruction becomes small.

2. The outside recognition device for a vehicle according to claim 1, wherein the orientation correction unit converts the orientation of the obstruction estimated by the orientation estimation unit based on a ray vector from the camera to the obstruction.

3. The outside recognition device for a vehicle according to claim 1, wherein the orientation correction unit obtains an orientation after correction by referring to a table from the position of the obstruction detected by the obstruction detection unit and the orientation of the obstruction estimated by the orientation estimation unit.

4. The outside recognition device for a vehicle according to claim 1, further comprising:
a distance sensor which measures a distance to the obstruction,
wherein the obstruction detection unit detects the position of the obstruction in the image acquired by the photographing of the camera based on the distance measured by the distance sensor.

5. The outside recognition device for a vehicle according to claim 1, wherein the parameter selection unit selects a parameter from a plurality of parameters obtained by training an identifier using different image groups depending on the positional relationship between the obstruction and the camera.

6. The outside recognition device for a vehicle according to claim 1, wherein the obstruction detection unit selects a parameter used for the obstruction detection depending on a positional relationship between the obstruction candidate and the camera.

7. The outside recognition device for a vehicle according to claim 1, wherein the orientation correction unit selects and outputs the closest orientation from the set candidates of the orientation regardless of the position of the obstruction.

8. The outside recognition device for a vehicle according to claim 1, wherein the obstruction detection unit detects a pedestrian as an obstruction,
the orientation estimation unit estimates an orientation of the pedestrian detected by the obstruction detection unit, and
the orientation correction unit corrects the orientation of the pedestrian estimated by the orientation estimation unit.

9. The outside recognition device for a vehicle according to claim 1, wherein the obstruction detection unit detects the vehicle as an obstruction,
the orientation estimation unit estimates an orientation of the vehicle detected by the obstruction detection unit, and
the orientation correction unit corrects the orientation of the vehicle estimated by the orientation estimation unit.

10. The outside recognition device for a vehicle according to claim 1, wherein the camera is a wide angle camera.

* * * * *